UNITED STATES PATENT OFFICE 2,398,882

RESINOUS COMPOSITIONS AND PLASTI-
CIZERS THEREFOR

Charles C. Clark, Kenmore, N. Y., assignor to
The Mathieson Alkali Works, Inc., New York,
N. Y., a corporation of Virginia No Drawing. Application October 3, 1942,
Serial No. 460,679

11 Claims. (Cl. 260—36)

This invention is concerned with plastic compositions and contemplates improvements in plasticizing compositions through the use of aliphatic esters of halogen-bearing aromatic polycarboxylic acids.

The invention finds particular application in plasticizing thermoplastic resins, such for example as polymerized styrene and polystyrene derivatives, although it is generally applicable to resinous compositions, particularly to resinous polymers and condensation products, and to cellulose esters such as cellulose acetate, cellulose nitrate, cellulose propionate, cellulose butyrate, cellulose benzoate and mixtures thereof.

Many resins and other thermoplastic compositions, for example polystyrene and cellulose acetate, are difficult to plasticize satisfactorily. In many instances plasticizers that are suitable for other resins or thermoplastic compositions are ineffective or incompatible with polystyrene, cellulose acetate and the like.

As the result of my investigations, I have discovered that substantially all resins and thermoplastic compositions such as the above mentioned cellulose esters and especially resin and cellulose esters that have been difficult to plasticize heretofore may be plasticized satisfactorily through the addition of relatively small proportions of aliphatic esters of halogen-bearing polycarboxylic acid. My plasticizers are effective not only with the resins and cellulose esters per se, but in other plastic compositions containing resins and cellulose esters, such for example, as lacquers.

Although small amounts of my plasticizers are effective, they are compatible in large proportions with resins and cellulose esters which have been difficult to plasticize heretofore. Thus, my plasticizers may be combined in relatively large proportions with polystyrene and polymers of substituted styrenes such as poly-methylstyrene, poly-chlorostyrene, poly-dichlorostyrene and the like. Moreover, cellulose esters, such as the acetate, propionate, butyrate, benzoate and mixtures of these esters (for example, cellulose acetate-butyrate) are greatly improved through the addition of my plasticizers and yield improved bulk plastics and films.

In short, a great variety of thermoplastic materials and particularly synthetic resins may be plasticized with aliphatic esters of halogenated aromatic polycarboxylic acids to yield in film or in bulk form plastics that are tougher, harder and longer lived and at the same time less brittle than plastics derived from similar resins with heretofore customary plasticizers. Moreover, the plasticizers of my invention are particularly desirable in that there is no tendency for them to separate from the plastic composition either upon polymerization or after polymerization and long standing.

To consider the plasticizers in somewhat greater detail, it should be noted that they are esters of halogenated aromatic polycarboxylic acids bearing carboxyl groups directly on the aromatic ring or rings, the term "polycarboxylic acid" being employed to include those having two or more carboxylic acid groups.

Polycarboxylic acids or anhydrides which, after halogenation and esterification, are suitable for the practice of my invention include phthalic, isophthalic, terephthalic, trimesic, pyromellitic, naphthalic and the like. The substitution of alkyl, aryl or other groups in such acids also produces compounds, for example the diphenic acids, fluorenone dicarboxylic acids and the like which may be halogenated and esterified and employed in the practice of my invention.

Generally speaking, the monocyclic acids (after halogenation and esterification) produce preferred plasticizers.

Although the invention is described hereinafter with particular reference to chlorine-bearing substitution products of aromatic polycarboxylic acids, it will be understood that other halogens may be employed. Preferred plasticizers for the practice of my invention usually contain two or more halogen atoms per molecule, although only one such halogen addition may be sufficient in some instances.

I have found that it is advantageous in many instances to use mixtures of the aliphatic esters of halogen bearing aromatic polycarboxylic acids rather than the pure compounds, since in this way I obtain liquids or low-melting solids that, as plasticizers, are preferable to higher melting compositions. By way of example, a preferred plasticizer prepared in accordance with my invention comprises a mixture of ethyl chlorophthalates containing 2 to 3 chlorine atoms per molecule, say an average of about 2.4 atoms of chlorine per molecule.

In the formation of the esters from the acids various aliphatic alcohols may be employed, the lower alcohols containing not more than six carbon atoms being preferred. It is advantageous in the esterification to employ primary or secondary alcohols, although the alcohol chains may be branched or straight. Among the plasticizers presently preferred are those prepared from ethyl, propyl, butyl and amyl alcohols.

The plasticizers may be synthesized in various ways. By way of example, a suitable plasticizer may be prepared by chlorinating phthalic anhydride in fuming sulfuric acid using a trace of iodine as a catalyst. The chlorination is continued until about 2.4 atoms of chlorine per molecule have been absorbed. Thereafter the chlorinated phthalic anhydride is esterified by ethanol, while passing through the mass a catalyst in the form of hydrogen chloride gas. The esterified product is purified by washing, drying and distillation to produce a composition that has a melting point of 88–90° F. and which crystallizes only very slowly after melting. Other aliphatic esters of halogenated phthalic anhydride can be prepared in a similar manner, the products being oils or low melting solids at room temperature.

A variety of catalysts, including antimony and its halides and iron and its halides may be employed in the halogenation step, i. e. in introducing halogen into the ring.

As disclosed in a co-pending application of Charles C. Clark and Paul H. Baker, Serial No. 462,846, filed October 21, 1942, anhydrous ferric chloride may be employed as the sole halogenating agent. In such case, the ferric chloride is more than a catalyst, since it is used in stoichiometric quantities and gives up its chlorine to the aromatic ring. In such a halogenation operation, chlorine gas is not brought into contact with the organic material to be halogenated but is employed in a separate operation in reaction with ferrous chloride formed by the decomposition of the ferric chloride, thereby regenerating the latter.

As indicated above, the ferric chloride is employed in stoichiometric proportions which vary according to the number of chlorine atoms desired in the ring. For example, in chlorinating 148 parts (1 mole of phthalic anhydride) the following proportions of ferric chloride are used:

| Atoms of Cl introduced per mole of phthalic anhydride | Parts of FeCl₃ required per 148 parts (1 mole) of phthalic anhydride |
|---|---|
| 1 | 324.6 |
| 2 | 649.2 |
| 3 | 973.8 |
| 4 | 1298.4 |

By way of example, phthalic anhydride may be chlorinated as follows:

Chlorine gas is passed over heated coarse iron filings until the iron is converted into ferric chloride. To 167 parts of the ferric chloride there is added 38 parts of phthalic anhydride, the resulting mixture being fused together and maintained at a temperature just insufficient to cause distillation, for 1½ hours. Thereafter, the temperature is raised and the chlorinated phthalic anhydride is distilled out of the reaction mixture.

Esterification of the chlorinated phthalic anhydride thereafter is conducted as described above.

However prepared, the esters of halogenated polybasic acids employed as plasticizers preferably should bear halogen on the ring because in such case they are more stable, so stable in fact that they do not evolve hydrohalogen acid on standing.

Other methods of preparing the ester plasticizers of my invention may be employed. For example phthalic anhydride may be esterified prior to chlorination, provided that care is taken in the latter step to introduce halogen on the ring only.

It will be clear, of course, that other derivatives of phthalic acid may be ring halogenated and subsequently converted into esters.

To consider my invention in somewhat greater detail, attention is directed to the following examples:

EXAMPLE 1

Diethyl and diamyl esters, respectively, of dichlorophthalic acids were mixed in various proportions with four different thermoplastics, namely, cellulose acetate, polystyrene, methyl methacrylate and cellulose nitrate. The plasticizing effect, in each instance, is shown in the following table in comparison with samples of the resin which contain no plasticizers.

*Dichlorophthalate*

| Resin | No plasticizer | Diethyl ester, percent | | | Diamyl ester, percent | | |
|---|---|---|---|---|---|---|---|
| | | 10 | 25 | 50 | 10 | 25 | 50 |
| Cellulose acetate | Brittle | | | Somewhat brittle | | | Flexible. |
| Polystyrene | Tough | Somewhat brittle | Somewhat brittle | Sticky | Tougher than blank. | Tougher than blank. | Sticky. |
| Methyl methacrylate | Hard | | | Rubbery | | | Rubbery. |
| Cellulose nitrate | ...do... | | | Sticky | | | Sticky. |

EXAMPLE 2

In this case, a coating composition was prepared by dissolving 1 part by weight of polystyrene in 7.7 parts of toluene. This mixture had a viscosity suitable for brushing. To 30.8 parts of mixture was added 1.3 parts of mixed ethyl esters of chlorinated phthalic acid containing an average of about 2.4 atoms of chlorine per molecule. Similar mixtures were made employing mixed butyl esters and mixed amyl esters of chlorinated phthalic acid.

For comparative purposes, another sample was made employing the same proportions of butyl phthalate in the same mixture of polystyrene and toluene and for further comparison the solution of polystyrene and toluene was used without any plasticizer.

In each instance, the resulting coating compositions were brushed onto a clean steel test panel which was allowed to dry overnight.

After drying overnight the following results were observed. The film containing no plasticizer, i. e. derived from the polystyrene and toluene alone, was very brittle but was not hard and showed only fair adhesion to the steel panel.

The film plasticized with butyl phthalate was plastic rather than brittle and was relatively tough, but it did not adhere well to the metal.

The remaining films, all of which were plasticized with the esters of chlorinated phthalic acid, were harder and tougher than the unplasticized film and adhered much better to the metal than the film plasticized with butyl phthalate.

The film plasticized with ethyl chlorophthalate was much harder and tougher than any of the other films. Moreover, it adhered much more strongly to the metal.

EXAMPLE 3

In this instance, a base solution was prepared by mixing 50 parts by weight of cellulose acetate with 52 parts by weight of ethyl acetate and 341 parts of acetone. The resulting solution was of brushing consistency. Some of this solution was employed on a test panel without the addition of a plasticizer. Another portion of the solution was plasticized with 1.3 parts by weight of butyl phthalate to 35.4 parts of the solution. Still other portions of the solution were plasticized, respectively, with ethyl, butyl and amyl esters of the chlorophthalic acid of Example 1, employing the same proportions as in the case of the butyl phthalate—1.3 parts of chloroesters to 35.4 parts of solution.

In all instances, the resulting coating compositions were brushed onto metal test panels and allowed to dry overnight. After drying the following results were observed. The unplasticized film was hard and brittle. The film plasticized with butyl phthalate was less brittle and considerably softer than the unplasticized film and did not adhere well to the metal. The films plasticized with the chloroesters were superior and were less brittle and more plastic than the other films and adhered more strongly to the metal. The film plasticized with the ethyl esters of the chlorophthalic acid gave the best film.

EXAMPLE 4

The plasticized blends of Example 2 were permitted to stand for six months. Re-examination at the end of this interval showed that the solvents had evaporated completely. In the case of the unplasticized sample of cellulose acetate, the result was a hazy translucent solid. The cellulose acetate plasticized with butyl phthalate was a hard white opaque solid. In all instances, the samples plasticized with the chlorophthalic esters were soft solids or clear viscous liquids. The blend containing the ethyl ester was particularly desirable and was a clear soft non-tacky solid.

I claim:

1. A thermoplastic composition from the class consisting of polystyrene resins, methyl methacrylate resins and cellulose esters plasticized with a mixture of alkyl halophthalates obtained by the esterification of a lower aliphatic alcohol with phthalic anhydride halogenated until from two to four atoms of halogen have been absorbed per molecule of phthalic anhydride.

2. A thermoplastic composition from the class consisting of polystyrene resins, methyl methacrylate resins and cellulose esters plasticized with a mixture of alkyl chlorophthalates obtained by the esterification of a lower aliphatic alcohol with phthalic anhydride chlorinated until from two to three atoms of chlorine have been absorbed per molecule of phthalic anhydride.

3. A thermoplastic composition from the class consisting of polystyrene resins, methyl methacrylate resins and cellulose esters plasticized with a mixture of ethyl chlorophthalates obtained by the esterification of ethanol with phthalic anhydride chlorinated until from two to three atoms of chlorine have been absorbed per molecule of phthalic anhydride.

4. A thermoplastic composition from the class consisting of polystyrene resins, methyl methacrylate resins and cellulose esters plasticized with a mixture of ethyl chlorophthalates obtained by the esterification of ethanol with phthalic anhydride chlorinated until an average of about 2.4 atoms of chlorine have been absorbed per molecule of phthalic anhydride.

5. A polystyrene resin plasticized with a mixture of alkyl chlorophthalates obtained by the esterification of a lower aliphatic alcohol with phthalic anhydride chlorinated until from two to three atoms of chlorine have been absorbed per molecule of phthalic anhydride.

6. A polystyrene resin plasticized with a mixture of ethyl chlorophthalates obtained by the esterification of ethanol with phthalic anhydride chlorinated until from two to three atoms of chlorine have been absorbed per molecule of phthalic anhydride.

7. A polystyrene resin plasticized with a mixture of ethyl chlorophthalates obtained by the esterification of ethanol with phthalic anhydride chlorinated until an average of about 2.4 atoms of chlorine have been absorbed per molecule of phthalic anhydride.

8. A cellulose ester plasticized with a mixture of alkyl chlorophthalates obtained by the esterification of a lower aliphatic alcohol with phthalic anhydride chlorinated until from two to three atoms of chlorine have been absorbed per molecule of phthalic anhydride.

9. A cellulose ester plasticized with a mixture of ethyl chlorophthalates obtained by the esterification of ethanol with phthalic anhydride chlorinated until from two to three atoms of chlorine have been absorbed per molecule of phthalic anhydride.

10. A cellulose ester plasticized with a mixture of ethyl chlorophthalates obtained by the esterification of ethanol with phthalic anhydride chlorinated until an average of about 2.4 atoms of chlorine have been absorbed per molecule of phthalic anhydride.

11. A polymerized dichlorostyrene plasticized with a mixture of ethyl chlorophthalates obtained by the esterification of ethanol with phthalic anhydride chlorinated until from two to three atoms of chlorine have been absorbed per molecule of phthalic anhydride.

CHARLES C. CLARK.